Patented Aug. 26, 1952

2,608,549

UNITED STATES PATENT OFFICE 2,608,549

INTERPOLYMERS OF VINYL CHLORIDE, HIGHER ALKYL ACRYLATE AND DIALKENYL ESTER OF OLEFINIC DICARBOXYLIC ACID

Robert J. Wolf, Cleveland, Ohio, assignor to The B. F. Goodrich Company, New York, N. Y., a corporation of New York No Drawing. Application April 25, 1950, Serial No. 158,064

5 Claims. (Cl. 260—78.5)

The present invention relates to interpolymers obtained by the polymerization of a monomeric mixture containing at least three monomeric components, each in particular proportions, one of which is vinyl chloride, another of which is a higher alkyl acrylate such as an octyl acrylate, and another of which is a dialkenyl ester of an olefinic dicarboxylic acid such as diallyl maleate, which interpolymers possess various new and improved properties, especially in regard to their inherent plasticity and ease of processing combined with hardness and excellent strength in final end use, and it pertains particularly to three-component interpolymers or tripolymers of these three types of monomers which are so inherently plasticized in nature as to be processed and made into excellent films, sheets, rods, tubes and plates without the addition of plasticizers.

Vinyl resins such as polyvinyl chloride and copolymers of vinyl chloride with various other monomeric materials such as methyl acrylate, vinyl acetate, vinylidene chloride and diethyl fumarate are well known to the art and in their plasticized form are widely used in numerous applications. The thermoplastic vinyl resin is itself relatively hard and horny at normal temperatures and is generally incapable of being easily subjected to processing operations such as milling, calendering, extruding, etc., without heating the resin to high temperatures. Addition of plasticizers, which generally are of the oily ester-type, lowers the softening point of the composition such that processing operations may be carried out at lower temperatures. However, addition of plasticizer concomitantly lowers the room temperature hardness of the plasticized composition and frequently makes the resin somewhat tacky. It is thus difficult to achieve a plasticized vinyl resin composition which is easily processed at moderate temperatures yet which in the final end product will have the many-times desirable properties of hardness, rigidity, etc.

There are additional disadvantages necessarily attending the use of plasticizers in vinyl resin compositions. The plasticizers commonly employed even when thoroughly mixed with the resin have a pronounced tendency to bleed or migrate to the surface of the composition where they are lost through wiping, washing or volatilization with the result that the composition gradually stiffens and hardens and consequently fails in service. Moreover, the migration of plasticizer destroys adhesive bonds between the plastic and other surfaces and mars varnished surfaces in contact with the plastic. An economic disadvantage is that the oily plasticizer materials must normally be incorporated into a vinyl resin by an expensive and time-consuming or mixing operation.

It is a primary object of this invention, therefore, to provide a new class of vinyl resins each member of which is possessed of many of the desirable properties of known vinyl resins but which is so inherently processable as to not require the addition of plasticizers during processing or to achieve plastic properties in the final product and which on that account can be employed to produce numerous articles which are more durable, serviceable and otherwise desirable. Another object is to provide a vinyl plastic which is not subject to loss of plasticity by volatilization, bleeding or extraction of plasticizer. It is also an object to provide new vinyl resins which are easily subjected to processing operations at moderately elevated temperatures yet which are not excessively soft or tacky and have desirable stiffness, rigidity and high strength at normal temperatures.

I have discovered that by polymerizing, preferably in an aqueous medium, monomeric mixtures containing at least three components, each in definite proportions, one being vinyl chloride, another of which is a higher alkyl ester of acrylic acid such as an octyl acrylate, and the third a dialkenyl ester of an olefinic dicarboxylic acid as hereinafter defined, I am able to obtain novel interpolymers having the properties necessary for achieving the above and other objectives.

The relative proportions of monomers which are employed in the production of my interpolymers are somewhat critical, since the desired properties are not secured in any proportion, but may vary within certain limits. In the monomeric mixture I have found it necessary to employ from 35 to 95% by weight of vinyl chloride, from 5 to 65% by weight of higher alkyl acrylate, and from 0.01 to 2.0% by weight of dialkenyl ester with at least 90% by weight of the monomeric mixture made up of these three ingredients. Other monomeric materials such as vinylidene chloride, diethyl fumarate, vinyl benzoate, acrylonitrile, styrene, isobutylene, lower alkyl acrylates such as methyl and ethyl acrylate and others are, if desirable, utilizable to the extent of 10% by weight of the monomeric mixture without substantially affecting the desirable properties. Particularly valuable are those interpolymers or tripolymers made from three component monomeric mixtures containing from 50 to 85% by weight of vinyl chloride, from 15 to 50% by weight of higher alkyl acrylate and from 0.1 to 2.0% by weight of diallyl maleate.

The higher alkyl acrylates which are employed in this invention are those alkyl esters of acrylic acid in which the alkyl group contains a chain of from 5 to 10 carbon atoms. I have found that the degree of plasticity or inherent processability imparted to my new interpolymers by these higher alkyl acrylates corresponds roughly with the observed degree of plasticization imparted to ordinary vinyl resins by addition thereto of ester type plasticizers containing similar alkyl groups. For example, di-2-ethylhexyl phthalate is an excellent plasticizer for vinyl chloride polymers and 2-ethylhexyl acrylate has been found to produce interpolymers possessing inherent processability to a high degree. Illustrative higher alkyl acrylates within the above class utilizable in this invention include n-amyl acrylate, n-hexyl acrylate, the isohexyl acrylates, isoheptyl acrylate, n-heptyl acrylate, capryl acrylate (1-methylheptyl acrylate), n-octyl acrylate, 2-ethylhexyl acrylate, isooctyl acrylates such as 6-methylhexyl acrylate, n-nonyl acrylate, isononyl acrylates such as 3,5,5-trimethylhexyl acrylate, n-decyl acrylate and others.

It is greatly preferred to employ higher alkyl acrylates in which the alkyl group contains a total of 8 to 10 carbon atoms and possesses a carbon chain of 6 to 10 carbon atoms. Compounds within this class are 6-methylheptyl acrylate, 3,5,5-trimethylhexyl acrylate, 2-ethylhexyl acrylate, capryl acrylate, n-octyl acrylate and others. This preferred class of higher alkyl acrylates has been found to impart a high degree of inherent processability to the interpolymers of this invention and n-octyl acrylate appears to be the most effective in this respect.

The dialkenyl esters of olefinic dicarboxylic acids utilizable in the production of my new interpolymers possess, in general, the formula

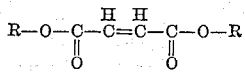

wherein R is an alkenyl radical containing a methylene group attached by a double bond to a carbon atom, that is, the structure

Esters of this class include the diallyl, dimethallyl, diethallyl, divinyl and di-isopropenyl esters of maleic and fumaric acids as well as mixed esters such as allyl methallyl maleate etc. Diallyl maleate because of its availability, lower cost and its ability to produce superior interpolymers according to this invention is the preferred dialkenyl ester.

It is preferred to carry out the polymerization of monomeric mixtures to produce my new interpolymers in an aqueous medium. When an aqueous polymeric dispersion is the desired end-product the polymerization is preferably carried out in an aqueous emulsion in the presence of an emulsifier. In addition to the preferred aqueous emulsion method, the mixture of monomers may be polymerized in aqueous medium containing a colloidal protective substance such as gelatin, bentonite clay, polyvinyl alcohol, polyacrylic acid, and others to obtain a fine granular or pearl-like polymer. The latter aqueous suspension method is a satisfactory method for producing polymer intended to be processed directly in the solid form. The mixture of monomers also may be polymerized in a suitable solvent or in mass in the absence of a solvent or diluent.

Whatever method of polymerization is employed a catalyst is generally required. The catalyst may be any of the substances commonly employed for the polymerization of vinyl compounds. Actinic radiation may be employed, as well as the various peroxygen compounds such as hydrogen peroxide, benzoyl peroxide, o,o'-dichlorobenzoyl peroxide, caproyl peroxide, caprylyl peroxide, pelargonyl peroxide, cumene hydroperoxide, tertiary butyl hydroperoxide, 1-hydroxycyclohexyl hydroperoxide, tertiary butyl diperphthalate, tertiary butyl perbenzoate, sodium, potassium and ammonium persulfate, sodium perborate, sodium percarbonate, and others. The oxidizing catalyst may be used in combination with a reducing substance such as a polyhydroxy phenol, sodium sulfite and the like in what is commonly referred to as a "redox" polymerization. Both the oxidizing and redox catalysts may be activated with small amounts of a heavy metal salt such as silver nitrate, copper sulfate, various ferric salts, etc.

In some instances it may be desirable to control or adjust the hydrogen ion concentration of the polymerization mixture, which tends to become more acid because of liberation of hydrochloric acid during polymerization. It is preferred therefore to add a buffering substance to the reaction mixture. For this purpose such substances as sodium bicarbonate, sodium carbonate, disodium phosphate, trisodium phosphate, ammonium hydroxide, sodium hydroxide, the amino-substituted alcohols such as 2-amino-2-methyl-1-propanol and the like, and others are suitable.

When the monomeric mixture is polymerized in aqueous emulsion a wide variety of emulsifying agents may be utilized. Suitable materials are, for example, ordinary soaps such as sodium oleate, potassium palmitate, sodium myristate, ethanol-amine laurate, and rosin and disproportioned rosin acid soaps; synthetic saponaceous materials such as the salts of alkaryl sulfonic acids, or of acid sulfuric esters of long chain alcohols such as sodium isopropyl napthalene sulfonate, sodium lauryl sulfate, and the sodium salts of sulfonated petroleum fractions and others.

While the polymerization may be carried out under an atmosphere containing air or oxygen, the rate of reaction is ordinarily faster under an atmosphere substantially free of oxygen and hence polymerization in an evacuated vessel or under an inert atmosphere is preferred. The temperature at which the reaction is carried out is not critical, it may be varied widely from −30° C. to 100° C. or higher, though best results are generally obtained at a temperature in the range of 0° C. to 70° C.

In order to minimize variation in the rate of reaction and to maintain a given proportion of each of the three types of monomers in the reaction mixture throughout the reaction cycle it is sometimes desirable to introduce the acrylate monomer and/or the dialkenyl ester in increments or gradually during the course of the polymerization. The acrylate and the diallyl maleate may be premixed and added to the reaction vessel at a rate consistent with that at which these monomers are "used up" in the reaction.

The preparation of the interpolymers of this invention, their properties and representative uses will be more clearly described in the following specific examples which are intended merely as illustrations of the nature of my invention and not as limitations on the scope thereof.

Example 1

A tripolymer is prepared by the polymerization of the monomeric materials contained in a reaction mixture having the following composition:

| Material | Parts by Weight |
| --- | --- |
| Vinyl chloride | 55.0 |
| Isononyl acrylate | 45.0 |
| Diallyl maleate | 0.01 |
| Potassium persulfate | 0.70 |
| Emulsifier | 4.0 |
| Ammonia | 0.20 |
| Water | 95.15 |

The water, potassium persulfate and emulsifier are charged to the reactor which then is sealed and evacuated. The ammonia and monomers are then added and the resultant mixture agitated and heated to 45° C. After 17 hours of reaction at 45° C. there results a fluid stable latex containing 50% total solids.

A portion of the latex is coagulated by the usual salt-acid method and the resultant coagulum dried in an air oven at 50° C. The dry granular polymer is found to band into smooth clear sheets without plasticizer on a two-roll plastic mill the rolls of which are maintained at only 150° F. The granular polymer flows with such ease that a disc can be press-molded from the polymer in only 3 minutes at 140° C. The press-molded disc is non-tacky, completely fused, and is strong and flexible, having a hardness of 80 durometer A at 30° C. A copolymer similarly prepared from a mixture consisting of 55 parts of vinyl chloride and 45 parts of isononyl acrylate is slightly tacky and has a hardness of about 75 durometer A.

The polymer of Example 1 forms a clear, water-white solution in tetrahydrofurfural from which excellent clear non-tacky films can be cast by drying and fusing at 100 to 150° C. The latex of Example 1, however, forms excellent clear non-tacky films when dried at room temperature. The films cast from both the tetrahydrofurfural solution and the latex are found to be exceedingly stable to the effects of light and heat by a test utilizing the tendency of vinyl chloride polymers to become colored and opaque when heated or exposed to ultra-violet light. According to this test a film of the polymer is deposited from solution on a clean glass microscope slide and the light transmitted through the coating measured both before and after exposure. The per cent light transmitted is taken as a qualitative indication of the light or heat stability of the polymer. By this method after being heated 24 hours at 175° C. the polymer of Example 1 has a heat stability of 60%. After exposure for 4 hours to a powerful ultra-violet light on a fadeometer the polymer of Example 1 evidences a light stability of 91%. By contrast unplasticized polyvinyl chloride by such a test has a heat stability of only 50% and a light stability of only 60%.

Similar results are obtained when the diallyl maleate content of the monomeric mixture of Example 1 is increased to 0.05 part. The tripolymer is slightly harder, 83 durometer A, yet is easily milled, calendered, extruded or molded by injection without the addition of plasticizer. When the diallyl maleate content is increased to 0.10 part, the resulting polymer has a hardness of 85 durometer A yet is more easily processable than either of the other tripolymers. For example, films cast from this polymer in solution or directly from its latex require heating only to 100° C. to be completely fused and clear. With 0.35 part of diallyl maleate, a tripolymer is produced having a hardness of 87 durometer A, a tensile strength of 1,900 pounds per square inch, an elongation of 250% and a modulus at 100% elongation of 1,100 pounds per square inch.

Example 2

A tripolymer is prepared in the manner of Example 1 from a monomeric mixture consisting of 55 parts by weight of vinyl chloride, 45 parts by weight of isononyl acrylate, and 0.5 part by weight of diallyl maleate. In 16 hours at 45° C. the reaction has reached substantial completion with the formation of a latex containing 50.5% total solids. The solid polymer derived from the latex has a hardness of 90 durometer A yet it bands smoothly without plasticizer on a plastic mill having its rolls maintained at only 150° F. The polymer is easily extruded without plasticizer to form strong rather stiff tubes and rods and is calendered (without plasticizer) on a four roll calender having its rolls maintained at 200° F. to form a smooth stiff film of 10 m. in thickness having extremely good flexural properties and high tear strength. When calendered on a fabric the polymer of this example forms a dry tack-free coating which when folded or rubbed on itself has the characteristic "feel" and "creak" so familiar in leather goods.

Example 3

A tripolymer is prepared by the polymerization of a reaction mixture having the following composition:

| Material | Parts by Weight |
| --- | --- |
| Vinyl chloride | 65.0 |
| 2-ethylhexyl acrylate | 35.0 |
| Diallyl maleate | 0.10 |
| Potassium persulfate | 0.2 |
| Ammonia | 0.2 |
| Water | 95.6 |

The polymerization is conducted at 50° C. to produce a stable latex containing 52.8% total solids. When the latex is coated on a smooth surface and dried at room temperature (30° C.) a clear film is deposited which may easily be stripped off the casting surface. When, however, the latex film is heated for 10 minutes at 135° C., an excellent clear film is obtained having a hardness of 95 durometer A, a tensile strength of 1900 lbs./sq. in., an elongation of 260%, and a modulus at 100% elongation of 1300 lbs./sq. in.

The solid tripolymer obtained by the coagulation of the latex of Example 3, mills very easily with good body on a mill having its rolls maintained at only 150° F. By the Clash-Berg flexibility temperature test, which measures the temperature at which a sample of polymer composition exhibits a given torsional loading, the tripolymer of this example has a flexibility temperature at 135,000 lbs./sq. in. loading of −27° C. By comparison a sample of polyvinyl chloride plasticized with 50 parts by weight of di-2-ethylhexyl phthalate so as to have a hardness of 85 durometer A has a Clash-Berg flexibility temperature of only −22.5° C. A comparable copolymer of 65 parts by weight of vinyl chloride and 35 parts of 2-ethylhexyl acrylate has a hardness of only 55A and a flexibility temperature of −25° C. and is very soft and tacky. Thus, the tripolymer of this example is quite hard yet is processable with great ease and in addition, is flexible and free of tack.

*Example 4*

A tripolymer is prepared by the polymerization in aqueous emulsion at 50° C. of a monomeric mixture containing 65% by weight of vinyl chloride, 34% by weight of 2-ethylhexyl acrylate and 1% by weight of diallyl maleate and is obtained in the form of a latex containing in excess of 50% total solids. The latex is utilized directly for the casting of latex films. When the latex is cast on a clean surface and dried at room temperature there are formed good clear films. When such a film is heated for 10 minutes at 135° C. an excellent clear film is obtained having a tensile strength in excess of 2000 pounds per square inch and an elongation of about 140%.

The solid tripolymer derived by coagulation of the tripolymer latex of this Example 4 is milled without plasticizer on a mill having the rolls maintained at only 175° F. When the tripolymer is press molded without plasticizer for 1 minute at 140° F. a clear completely fused disc is obtained. The hardness of the tripolymer sheet is in excess of 100 durometer A, however, the tripolymer is easily extruded without plasticizer to form hard and rigid tubes and rods.

Tripolymers made in a similar manner utilizing monomeric mixtures containing 1½ and 2% by weight of diallyl maleate are progressively harder and stiffer in nature yet can be processed at moderate temperatures of 200° to 250° F. without plasticizer.

*Example 5*

Tripolymers may be made with considerable variation in the amount of vinyl chloride and higher alkyl acrylate employed. For example, a tripolymer resulting from the polymerization in the manner of the preceding examples of a monomeric mixture containing only 35% by weight of vinyl chloride, 65% by weight of n-octyl acrylate and 1% by weight of diallyl maleate has exceptional processability without plasticizer yet is not excessively soft or tacky.

On the other hand, a tripolymer made from a monomeric mixture consisting of 80 parts by weight of vinyl chloride, 20 parts by weight of 2-ethylhexyl acrylate, and 0.10 part by weight of diallyl maleate is a relatively hard (98 durometer A) and rigid material having outstanding processability. The tripolymer is formed into a smooth clear band by milling for eight minutes on a two-roll plastic mill having its rolls maintained at only 200° F. A standard commercial grade of polyvinyl chloride when plasticized with 50 parts by weight per 100 parts of resin of di-2-ethylhexyl phthalate (so as to have a hardness of 85 durometer A) requires a milling cycle of 10 minutes at 280° F. Similarly, the tripolymer is easily extruded in a plastic extruder having a rear cylinder temperature of 200° F. and a front die temperature of 210° F. while the softer polyvinyl chloride composition requires corresponding temperatures, respectively, of 340° F. and 400° F.

In addition, the tripolymer's extreme ease of processing is shown by its being easily calendered to a 10 mil thickness on a four-roll calender having all four rolls maintained at only 240° F. while the plasticized polyvinyl chloride composition requires a temperature of 350° F.

The latex of this 80/20/0.10 tripolymer when used directly to form unsupported latex cast film, forms excellent, clear film merely by drying at room temperature. When heated for 10 minutes at 135° C., the resultant film is found to possess a tensile strength of over 3000 lbs./sq. in. and an elongation of 250%. The tripolymer film is tough, hard and flexible and is admirably adapted to use as a food packaging material.

*Example 6*

The previous examples have been concerned with tripolymers made from monomeric mixtures containing only the three essential ingredients; however, other monomers may be utilized to produce multi-component interpolymers. For example, a mixture consisting of 55 parts by weight of vinyl chloride, 35 parts by weight of isononyl acrylate, 10 parts by weight of styrene and 0.2 part by weight of diallyl maleate polymerizes in aqueous emulsion to produce a tetrapolymer easily processable without plasticizer and having good heat and light resistance. Similarly, polymerization of a mixture consisting of 60 parts by weight of vinyl chloride, 20 parts by weight of isononyl acrylate, 20 parts by weight of n-amyl acrylate, and 0.4 part by weight of diallyl maleate results in a tetrapolymer having a high degree of processability requiring molding for only 1 minute at 140° C. (without plasticizer) to form a completely fused, clear but stiff disc or sheet. Acrylonitrile, methyl acrylate, ethyl acrylate, vinylidene chloride, vinyl acetate, vinyl benzoate, isobutylene and other monoolefinic monomers may be substituted for the styrene as above in amounts up to 10% of the monomeric mixture with substantially similar results. However, since the use of such other monomeric materials does not result in additional advantageous properties it is of course generally preferred to produce interpolymers from monomeric mixtures containing only vinyl chloride, a higher alkyl acrylate, and diallyl maleate.

When the above examples are repeated using other dialkenyl esters of the class described herein such as dimethallyl maleate and diallyl fumarate, substantially equivalent results are secured.

While the invention has been described with particular reference to certain preferred embodiments thereof it is possible to make variations and modifications therein without departing from the spirit and scope of the invention as defined in the appended claims.

I claim:

1. An interpolymer made by polymerizing a mixture of monomeric materials comprising from 50 to 85% by weight of vinyl chloride, from 10 to 50% by weight of an alkyl ester of acrylic acid in which the alkyl group contains from 8 to 10 carbon atoms and posseses a carbon chain of from 6 to 10 carbon atoms in length and from 0.1 to 2.0% by weight of an ester of the formula

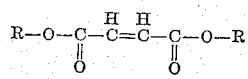

wherein each R represents an alkenyl radical of from 2 to 5 carbon atoms containing the structure $CH_2=C<$, at least 90% by weight of the said monomeric mixture being composed of the enumerated monomeric materials.

2. A tripolymer made by polymerizing in aqueous emulsion a mixture of monomeric materials consisting of from 50 to 85 parts by weight of vinyl chloride, from 15 to 50 parts by weight of an alkyl ester of acrylic acid in which the alkyl group contains from 8 to 10 carbon atoms and possesses a carbon chain of from 6 to 10 carbon atoms in length and from 0.1 to 2.0 parts by weight of diallyl maleate.

3. A tripolymer made by polymerizing in aqueous emulsion a monomeric mixture consisting of from 50 to 85 parts by weight of vinyl chloride, from 15 to 50 parts by weight of 2-ethylhexyl acrylate and from 0.1 to 2.0 parts by weight of diallyl maleate.

4. A tripolymer made by polymerizing in aqueous emulsion a monomeric mixture consisting of from 50 to 85 parts by weight of vinyl chloride, from 15 to 50 parts by weight of 3,5,5-trimethylhexyl acrylate, and from 0.1 to 2.0 parts by weight of diallyl maleate.

5. A tripolymer made by polymerizing in aqueous emulsion a monomeric mixture consisting of from 50 to 85 parts by weight of vinyl chloride, from 15 to 50 parts by weight of n-octyl acrylate, and from 0.1 to 2.0 parts by weight of diallyl maleate.

ROBERT J. WOLF.

REFERENCES CITED

The following references are of record in the file of this patent:

UNITED STATES PATENTS

| Number | Name | Date |
|---|---|---|
| 2,202,846 | Garvey et al. | June 4, 1940 |
| 2,496,384 | Nie | Feb. 7, 1950 |

OTHER REFERENCES

Rehberg et al., Ind. Eng. Chem., 40, 1429–33 (Aug. 1948).